(12) United States Patent
Nishimura et al.

(10) Patent No.: US 6,465,135 B1
(45) Date of Patent: *Oct. 15, 2002

(54) POLYMERIC SOLID ELECTROLYTE AND ELECTROCHEMICAL ELEMENT USING THE SAME

(75) Inventors: Naoto Nishimura, Kashihara (JP); Takehito Mitate, Yamatotakada (JP); Naoto Torata, Kitakatsuragi-gun (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/198,568

(22) Filed: Nov. 23, 1998

(30) Foreign Application Priority Data

Dec. 9, 1997 (JP) .............................. 9-338907

(51) Int. Cl.⁷ .......................... H01M 6/18; H01M 6/24; H01M 10/08
(52) U.S. Cl. ........................ 429/309; 429/303; 429/317
(58) Field of Search ................. 429/300, 301, 429/302, 303, 307, 316, 304, 188, 189, 309, 324

(56) References Cited

U.S. PATENT DOCUMENTS

| | | | | |
|---|---|---|---|---|
| 5,009,970 A | * | 4/1991 | Kronfli | 429/192 |
| 5,037,712 A | * | 8/1991 | Shakle | 429/192 |
| 5,102,752 A | * | 4/1992 | Hope | 429/192 |
| 5,223,353 A | * | 6/1993 | Ohsawa | 429/192 |
| 5,240,791 A | * | 8/1993 | Izuti | 429/192 |
| 5,529,859 A | | 6/1996 | Shu et al. | |
| 5,750,730 A | | 5/1998 | Nakamo et al. | |
| 5,755,985 A | * | 5/1998 | Vallee | 252/62.2 |
| 5,834,136 A | * | 11/1998 | Gao | 429/192 |
| 5,925,283 A | * | 7/1999 | Taniuchi | 252/62.2 |
| 5,968,681 A | * | 10/1999 | Miura | 429/122 |

FOREIGN PATENT DOCUMENTS

| | | |
|---|---|---|
| DE | 197 00 656 A1 | 7/1997 |
| EP | 0 631 339 A2 | 12/1994 |
| EP | 0 806 804 A1 | 11/1997 |
| EP | 0 823 744 A2 | 2/1998 |
| JP | 59196577 A | 11/1984 |
| JP | 612143734 A | 9/1986 |
| JP | 01213355 A | 8/1989 |
| JP | 08138737 A | 5/1996 |
| JP | 08138738 A | 5/1996 |
| WO | 96/21639 | 7/1996 |
| WO | 97/44842 | 11/1997 |
| WO | 98/31064 | 7/1998 |

* cited by examiner

Primary Examiner—Stephen Kalafut
Assistant Examiner—Mark Ruthkosky
(74) Attorney, Agent, or Firm—Nixon & Vanderhye P.C.

(57) ABSTRACT

A polymeric solid electrolyte is composed of a polymer that contains an electrolyte salt and an organic solvent. The organic solvent is composed of a fluorinated organic solvent. The polymer solid electrolyte can retain a sufficiently high ion conductivity and provides excellent safety by exhibiting flame retardancy when heated.

5 Claims, 1 Drawing Sheet

POLYMERIC SOLID ELECTROLYTE AND ELECTROCHEMICAL ELEMENT USING THE SAME

CROSS-REFERENCE TO RELATED APPLICATIONS

This application is related to Japanese patent application No. HEI 09-338907 filed on Dec. 9, 1997 whose priority is claimed under 35 USC §119, the disclosure of which is incorporated herein by reference in its entirety.

BACKGROUND OF THE INVENTION

1. Field of the Invention

The present invention relates to a polymeric solid electrolyte and an electrochemical element using the same, and more particularly to a polymeric solid electrolyte as an ionic conductor and an electrochemical element incorporating the same.

2. Description of the Related Arts

Recently, extensive development is conducted on electrochemical elements such as a condenser, a battery, an electrochromic element, a sensor, an electrochemical diode and an electrochemical FET. If all constituent components in these electrochemical elements could be solidified the electrochemical elements would be enjoyed with a scale reduction, improvement of reliability and safety, and moreover high functionality due to possible integration and lamination. Therefore, solidification of the electrochemical elements is eagerly desired.

However, the following problems still remain unresolved in solidifying an ionic conductor in the electrochemical elements.

For example, Japanese Unexamined Patent Publication Nos. SHO 58(1983)-1973, SHO 58(1983)-19807 and SHO 58(1983)-75779 propose to use polymeric solid electrolytes to electrochemical elements. However, because ion conductivity of these electrolytes is not sufficiently high, the electrochemical elements incorporating such electrolytes still show drawbacks in load properties and response properties.

In contrast, Japanese Unexamined Patent Publication Nos. SHO 59(1984)-196577, SHO 61(1986)-214374 and HEI 1(1989)-213355 propose to use, as an electrolyte, a gel obtained by allowing an organic solvent to be contained in a polymeric solid electrolyte, thereby increasing the ionic conductivity.

However, the organic solvent to be used in gelling the polymer solid electrolyte may decompose under a high voltage, thereby decreasing the reliability of the elements. Moreover, when the electrochemical elements generate heat, the organic solvent may possibly start to burn, so that the safety of the electrochemical elements is not sufficiently high.

SUMMARY OF THE INVENTION

The present invention has been made in view of these circumstances and the purpose thereof is to provide a polymeric solid electrolyte and a electrochemical element using the same that are excellent in reliability and safety.

Accordingly, the present invention provides a polymeric solid electrolyte comprising a polymer that contains an electrolyte salt and an organic solvent, the organic solvent comprising a fluorinated organic solvent. Also, the present invention provides an electrochemical element incorporating the above-mentioned polymeric solid electrolyte as an ionic conductor.

BRIEF DESCRIPTION OF THE DRAWING

The present invention will be better understood from the following detailed description of preferred embodiments of the invention, taken in conjunction with the accompanying drawing, in which.

DETAILED DESCRIPTION OF THE PREFERRED EMBODIMENTS

Figure 1:
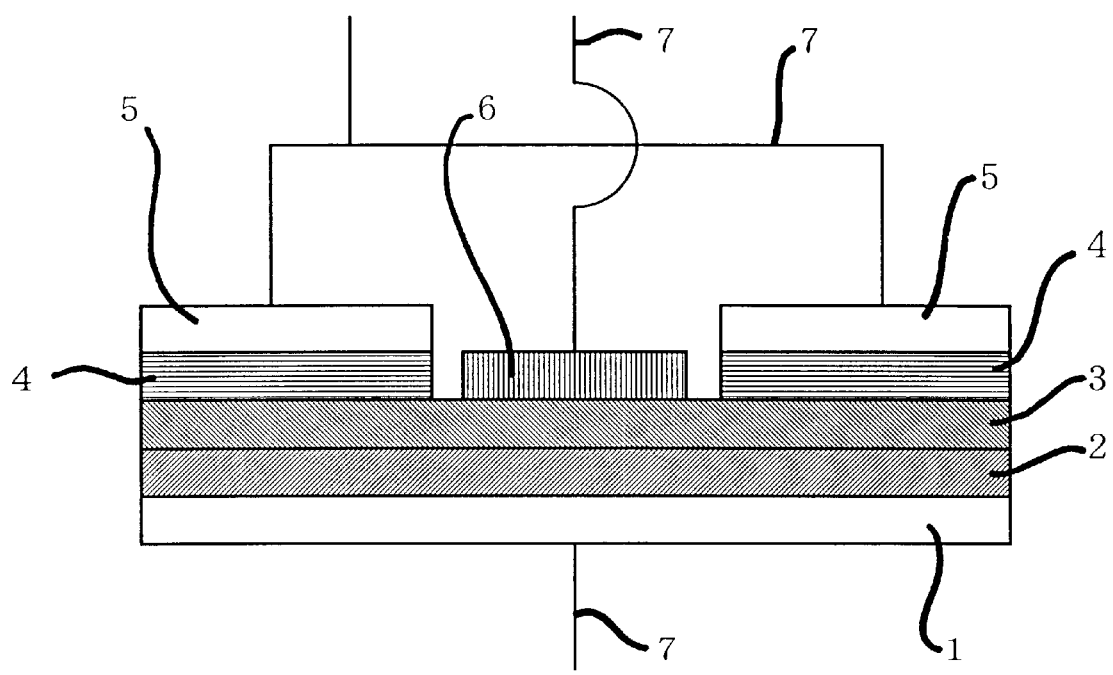
FIG. 1 is a schematic cross-sectional view illustrating an embodiment of an electrochemical element according to the present invention.

A polymeric solid electrolyte according to the present invention comprises a polymer that contains an electrolyte salt and an organic solvent.

The electrolyte salt to be used in the present invention is not specifically limited as long as it can be used in an ordinary electrochemical element. For example, the electrolyte salt may be a salt of one or more cations selected from the group consisting of an alkaline metal (such as lithium, sodium or potassium) ion, alkaline earth metal (such as magnesium or calcium) ion and tetraalkylammonium (tetraalkyl ammonium having 4 to 16 carbon atoms, preferably tetramethylammonium, tetraethylammonium, tetrapropylammonium, tetrabutylammonium or the like) ion, and one or more anions selected from the group consisting of perchlorate ion, hexafluorophosphate ion, tetrafluoroborate ion and trifluoromethanesulfonate ion. More specifically, the electrolyte salt may be one or more of $LiClO_4$, $LiBF_4$, $LiAsF_6$, $LiPF_6$, $LiSbF_6$, $LiCF_3SO_3$, $LiN(CF_3SO_2)_2$, $LiC(CF_3SO_2)_3$, $NaClO_4$, $NaBF_4$, $NaSCN$, $KBF_4$, $Mg(ClO_4)_2$, $Mg(BF_4)_2$, $(C_4H_9)_4NBF_4$, $(C_2H_5)_4NBF_4$, $(C_4H_9)_4NClO_4$ and the like. In order to exhibit good ionic conductivity, the electrolyte salt is added preferably in an amount of about 0.5 mol to 2 mol, more preferably 1 mol to 1.5 mol, with respect to 1 liter of the later-mentioned organic solvent.

The organic solvent to be used in the present invention may be a fluorinated organic solvent. For example, the organic solvent may be a fluoride of an ether solvent (such as methylal, 1,2-dimethoxyethane, 1-ethoxy-2-methoxyethane or 1,2-diethoxyethane), an ester solvent (such as ethyl acetate, methyl propionate or ethyl propionate), a lactone solvent (such as γ-butyrolactone, γ-valerolactone, δ-valerolactone, 3-methyl-1,3-oxazolidine-2-one or 3-ethyl-1,3-oxazolidine-2-one), a carbonate solvent (such as propylene carbonate, ethylene carbonate, styrene carbonate, dimethyl carbonate, ethyl methyl carbonate or diethyl carbonate), a nitrile solvent (such as acetonitrile or 3-methoxypropionitrile), a furan solvent (such as tetrahydrofuran or 2,5-dimethoxytetrahydrofuran), an imidazolidinone solvent (such as 1,3-dimethyl-2-imidazolidinone) or a pyrrolidone solvent (such as N-methyl-2-pyrrolidone). These fluorinated organic solvents may be used alone or in combination. These fluorinated organic solvents are preferable because they are stable in electrochemical oxidation and reduction. In preparing these fluorides, one or more hydrogen atoms in the organic solvent may be substituted with fluorine atoms, and further all hydrogen atoms may be substituted with fluorine atoms.

Among these fluorinated organic solvents, fluorides of carbonate solvents, ether solvents and ester compounds are preferable.

Specific examples of the fluorinated organic solvents to be used in the present invention include 1-fluoromethoxy-1-methoxymethane, 1-difluoromethoxy-1-methoxymethane, 1-trifluoromethoxy-1-methoxymethane, 1,1-difluoromethoxymethane, 1-fluoromethoxy-2-methoxyethane, 1-difluoromethoxy-2-methoxyethane, 1-trifluoromethoxy-2-methoxyethane, 1,1-difluoromethoxyethane, 1-fluoroethoxy-2-methoxyethane, 1-difluoroethoxy-2-methoxyethane, 1-trifluoroethoxy-2-methoxyethane, 1-fluoroethoxy-2-fluoromethoxyethane, 1-fluoroethoxy-2-ethoxyethane, 1-difluoroethoxy-2-ethoxyethane, 1,2-difluoroethoxyethane, fluoroethyl acetate, difluoroethyl acetate, trifluoroethyl acetate, fluoromethyl propionate, difluoromethyl propionate, trifluoromethyl propionate, fluoroethyl propionate, difluoroethyl propionate, trifluoroethyl propionate, 3-fluoropropylene carbonate, 4-fluoropropylene carbonate, 3-difluoropropylene carbonate, 3-fluoro-4-fluoropropylene carbonate, 3-difluoro-4-fluoropropylene carbonate, 4-trifluoromethylethylene carbonate, 4-trifluoromethyl-3-fluoroethylene carbonate, 4-trifluoromethyl-4-fluoroethylene carbonate, 4-trifluoromethyl-3-difluoroethylene carbonate, 4-trifluoromethyl-3-fluoro-4-fluoroethylene carbonate, perfluoro-propylene carbonate, 4-(monofluoromethyl)-1,3-dioxolane-2-one, 4-(difluoromethyl)-1,3-dioxolane-2-one, 4-(monofluoromethyl)-5-methyl-1,3-dioxolane-2-one, 4-(monofluoromethyl)-4-methyl-1,3-dioxolane-2-one, 4-(monofluoromethyl)-5,5-dimethyl-1,3-dioxolane-2-one, 4-(1-fluoroethyl)-1,3-dioxolane-2-one, 4-(1-fluoro-n-propyl)-1,3-dioxolane-2-one and 4-(1-fluoro-n-butyl)-1,3-dioxolane-2-one.

The organic solvent may be added preferably in a volume ratio of (organic solvent):(polymer)=about 1:99 to 95:5, more preferably about 10:90 to 90:10 with respect to the later-mentioned polymer.

The polymer to be used in the present invention may be mainly polyalkyleneoxide, polyacrylonitrile (PAN), polyvinylidene fluoride (PVDF) or the like. The polymer preferably has a molecular weight in a range of about 1,000 to about 200,000 so that the obtained polymeric solid electrolyte may exhibit good mechanical strength. The polyalkyleneoxide may be polyethylene oxide (PEO), polypropylene oxide (PPO), polybutylene oxide, polystyrene oxide, polyallylglycidine ether or the like. Among these, PEO and PPO are more preferable.

In the present invention, the above-mentioned components (the electrolyte salt, the organic solvent and the polymer) may be mixed with heating to obtain a solution, which is then cooled to yield a solid electrolyte. Alternatively, into a solution obtained by dissolving the polymer in the fluorinated organic solvent, the electrolyte salt and optionally one or more of a cross-linking agent, a photopolymerization initiator, a sensitizer and a storage stabilizer may be added, and then the mixture may be cured (gelled) by application of active rays to yield a solid electrolyte. Especially, in the case where the polymer is PAN or PVDF, it is preferable that the polymer is dissolved in the fluorinated organic solvent by heating and then the mixture is cooled for gelation. In the case where the polymer is PEO or PPO, it is preferable that the polymer and the cross-linking agent are dissolved in the fluorinated organic solvent and then the mixture is cured (gelled) by application of active rays. Here, although the solid electrolyte of the present invention may be formed of a single layer or a laminated layer, it is preferable that the total thickness of the solid electrolyte film is about 5 to 100 $\mu$m.

Specifically, the temperature in heating and mixing the above-mentioned components, i.e. the electrolyte salt, the fluorinated organic solvent and the polymer, may be suitably adjusted in accordance with the kind and quantity of the electrolyte salt, the fluorinated organic solvent and the polymer to be used. If the heating temperature is too high, the polymer may decompose or the organic solvent may evaporate. Therefore, the heating temperature is preferably within the range of about 40 to about 150° C. The mixing of the components may be carried out by a known method, for example, by using a magnetic stirrer, a turbine blade stirrer, a multiple blade stirrer, an anchor blade stirrer, a gate-type blade stirrer, a ribbon-type blade stirrer, a screw-type blade stirrer or the like.

The cross-linking agent that is optionally used in the present invention may be, for example, a (meth)acrylate such as a monofunctional (meth)acrylate or a polyfunctional (meth)acrylate, or a mixture of these.

The monofunctional (meth)acrylate may be, for example, an alkyl (meth)acrylate such as methyl (meth)acrylate, butyl (meth)acrylate or trifluoroethyl (meth)acrylate, a hydroxyalkyl (meth)acrylate such as hydroxyethyl acrylate or hydroxypropyl acrylate, a hydroxypolyoxyalkylene (meth)acrylate containing an oxyalkylene group having preferably 1 to 4 carbon atoms such as hydroxypolyoxyethylene (meth)acrylate or hydroxypolyoxypropylene (meth)acrylate, or an alkoxy (meth)acrylate containing an alkoxy group having preferably 1 to 4 carbon atoms such as methoxyethyl acrylate or ethoxyethyl acrylate. Among these, alkoxy (meth)acrylates are preferable.

Examples of the polyfunctional (meth)acrylates to be used in the present invention include, photopolymerizing monomers and photopolymerizing prepolymers. Among these, multifunctional photopolymerizing monomers and photopolymerizing prepolymers having three or more functions are preferable. Specifically, the polyfunctional (meth)acrylate is preferably trimethylolpropane triacrylate, pentaerythritol triacrylate, pentaerythritol pentaacrylate, dipentaerythritol hexaacrylate or the like.

The cross-linking agent is preferably added at an amount of about 0.1 to 50% by weight with respect to the polymer.

The optional photopolymerization initiator may be, for example, an oxo compound, a sulfur compound, a halide of a polycondensed-ring hydrocarbon, a pigment, a dye, a metal salt or the like.

Examples of the oxo compounds include benzoins such as benzoin, benzoin methyl ether, benzoin ethyl ether, benzoin isopropyl ether, benzoin isobutyl ether, α-methylbenzoin and α-phenylbenzoin, anthraquinones such as anthraquinone, methylanthraquinone and chloroanthraquinone, and in addition, benzyls, diacetyls, acetophenones, benzophenones and methylbenzoyl formates.

Examples of the sulfur compounds include diphenyl sulfone, diphenyl sulfide and dithiobiscarbamate.

Examples of the halides of polycondensed-ring hydrocarbons include α-chloromethylnaphthalene and the like.

Examples of the pigments and dyes include acriflavine and fluorescein.

Examples of the metal salts include iron chloride and silver chloride.

These additives may be used alone, or two or more of these additives may be used as a mixture. Among these, oxo compounds and sulfur compounds are preferable.

Also, a radical initiator may be optionally used together with the cross-linking agent and/or the photopolymerization initiator. Examples of the radical initiators include, for example, azobisisobutyronitrile and benzoyl peroxide.

The photopolymerization initiator is preferably added at an amount of about 0.01 to 10% by weight with respect to the polymer.

Examples of the optional sensitizers to be used in the present invention include urea, nitrile compounds (such as N,N-di-substituted-p-aminobenzonitrile), phosphorus compounds (such as tri-n-butylphosphine).

The sensitizer is preferably added at an amount of about 0.01 to about 10% by weight with respect to the polymer.

Examples of the optional storage stabilizers include, quaternary ammonium chloride, benzothiazole and hydroquinone.

The storage stabilizer is added preferably at an amount of about 0.01 to about 10% by weight with respect to the polymer.

The active rays to be applied in the present invention may have a wavelength of 190 to 400 nm. This is due to the following reason. If the active rays have an energy higher than the rays of 190 nm, the polymer itself may decompose. On the other hand, if the active rays have an energy lower than the rays of 400 nm, the optionally-added photopolymerization initiator may not work. At this moment, the temperature of the portion to which the active rays are applied may become high. However, even in such a case, it is preferable to suitably adjust the energy of the active rays and the period of time for application of the active rays so that the temperature may not rise above 150° C.

The present invention also provides an electrochemical element incorporating the above-mentioned polymeric solid electrolyte. The electrochemical element may be a condenser, a battery, a capacitor, an electrochromic element, an electrochemical diode, an electrochemical FET, a sensor or the like. These electrochemical elements can be fabricated by forming a solid electrolyte on a pre-formed electrode. The solid electrolyte may be formed in the same manner as mentioned above.

The material for the electrode constituting the electrochemical element is not specifically limited as long as it is an electrically conductive material, so that the electrode may be formed of any electrically conductive material. For example, the electrode may be formed of metal, metal oxide, metal chalcogenide, glass, carbon, electrically conductive polymer (such as polyaniline or polypyrrole) or the like. The electrode may be formed on a substrate depending on the kind of the electrochemical element. The substrate to be used in the present invention is not specifically limited. The substrate may be formed of glass, ceramics, metal, paper, plastics or the like. Also, it is possible to use an electrically conductive substrate obtained by applying indium tin oxide, metal (such as gold, silver or copper), metal chalcogenide, carbon, electrically conductive polymer (such as polyaniline or polypyrrole) or the like onto any of these substrates.

Particularly, if the electrochemical element is a battery, it is preferable to bond the solid electrolyte by pressure contact or to directly form the solid electrolyte on the electrode obtained by bonding a mixture of an electrode active material and optionally an electrically conductive agent and a binder on a metal thin film having a thickness of 5 to 50 µm.

In other words, after the polymer is dissolved in the fluorinated organic solvent, the electrolyte salt is added, and optionally one or more of the cross-linking agent, the photopolymerization initiator, the sensitizer, and the storage stabilizer are added. Then, after the obtained mixture is applied onto an electrode by the screen printing method or the like, active rays are applied onto a desired portion of the electrode for gelation to obtain the solid electrolyte.

Alternatively, after the application of the mixture, at least a desired portion of the electrode is heated to start a polymerization reaction to obtain the solid electrolyte.

The polymeric solid electrolyte and the electrochemical element incorporating the electrolyte of the present invention will be hereafter detailed by way of Examples. However, the present invention is not limited to these Examples alone.

EXAMPLE 1 AND COMPARATIVE EXAMPLE 1

Ionic Conductor A LiPF$_6$ was dissolved in 3,4-difluoro propylene carbonate so that the salt concentration would be 1 mol/liter. Into 3 g of the obtained mixture, Ig of PVDF having an average molecular weight of about 150,000 was completely dissolved at a temperature of 120° C. and the solution was cast onto a metal substrate. Then, after the metal substrate was sufficiently cooled at room temperature, the resilting solid electrolyte film was peeled off from the metal substrate to obtain an ionic conductor A.

Ionic Conductor B (C$_2$H$_5$)$_4$NBF$_4$ was dissolved in a mixed solvent containing 3,4-difluoro ethylene carbonate and fluoroethyl carbonate in equal volume so that the salt concentration would be 1.2 mol/liter. Into 4 g of the obtained mixture solution, 1 g of a mixture of ethylene oxide oligomer having an average molecular weight of 8,000, methyl methacrylate oligomer as a cross-linking agent, and benzoin methyl ether as a polymerization initiator (in a ratio of 80:18:2) was completely dissolved at room temperature, and the obtained solution was cast onto a glass substrate. Thereafter, the cast solution was cross-linked for solidification by application of UW rays having a wavelength of 300 to 400 nm, and a solid electrolyte film was peeled off to obtain an ionic conductor B.

Ionic Conductor C

NaClO$_4$ was dissolved in a mixed solvent containing 3,4-difluoro ethylene carbonate and 3,4-difluoro propylene carbonate in equal volume so that the salt concentration would be 0.8 mol/liter. Into 4 g of the obtained mixture solution, 1 g of PAN having an average molecular weight of about 150,000 was completely dissolved at a temperature of 120° C., and the solution was cast onto a metal substrate. Then, after the metal substrate was sufficiently cooled gradually at room temperature, a solid electrolyte film was peeled off from the metal substrate to obtain an ionic conductor C.

Ionic Conductor D

A solid electrolyte film was fabricated to obtain an ionic conductor D under the same condition as that of the ionic conductor A except that propylene carbonate was used as the organic solvent.

Ionic Conductor E

A solid electrolyte film was fabricated to obtain an ionic conductor E under the same condition as that of the ionic conductor B except that a mixed solvent containing ethylene carbonate and diethyl carbonate in equal volume was used as the organic solvent.

Ionic Conductor F

A solid electrolyte film was fabricated to obtain an ionic conductor F under the same condition as that of the ionic conductor C except that a mixed solvent containing ethylene carbonate and propylene carbonate in equal volume was used as the organic solvent.

Burning Test

As Example 1, the solid electrolyte films of the ionic conductors A to C were disposed between metal meshes, and a burning test was carried out by applying a flame of a gas burner to the ionic conductors A to C.

As Comparative Example 1, the solid electrolyte films of the ionic conductors D to F were disposed between metal meshes, and a burning test was carried out by applying a flame of a gas burner to the ionic conductors D to F.

The results are shown in Table 1.

TABLE 1

|  | Solid electrolyte | Burning state |
|---|---|---|
| Example 1 | Ionic conductor A | White smoke only |
|  | Ionic conductor B | White smoke only |
|  | Ionic conductor C | White smoke only |
| Comparative | Ionic conductor D | Red Flame |
| Example 1 | Ionic conductor E | Yellow flame |
|  | Ionic conductor F | Yellow flame |

From the results shown in Table 1, it is found that the solid electrolyte of the Example 1 that contains a fluorinated organic solvent is more flame-retardant than the solid electrolyte of the Comparative Example 1 that does not contain a fluorinated organic solvent.

EXAMPLE 2 AND COMPARATIVE EXAMPLE 2

Electrochemical Element

Referring to FIG. 1, a cell of an electrochemical element according to Example 2 of the present invention, includes: a collector 1 formed of a nickel plate having a thickness of 50 μm; an electrode 2 formed on the collector 1, the electrode 2 being formed of a lithium metal plate having a thickness of 100 μm; an ionic conductor 3 formed on the electrode 2, the ionic conductor 3 being formed of the ionic conductor A having a thickness of 100 μm; an electrode 4 having a thickness of 100 μm formed on the ionic conductor 3, the electrode 4 being formed of a mixture of manganese dioxide, an electrically conductive agent and a binder; a collector 5 formed on the electrode 4, the collector 5 being formed of an aluminum foil having a thickness of 20 μm; and a reference electrode 6 formed on the ionic conductor 3, the reference electrode 6 being formed of a lithium metal chip.

In this cell, an electric current between the electrode and the electrode 2 was measured when constant voltages of 3, 4 and 5V were each applied between the reference electrode 6 and the electrode 4. The electric current was measured as electric current values immediately after the application of the voltage, after 30 minutes and after 12 hours.

As a Comparative Example 2, cells were fabricated in the same manner as in the Example 2 except that the ionic conductor D fabricated in the comparative Example 1 was used as the ionic conductor 3 instead of the ionic conductor A to measure the electric current values in the above-mentioned manner. The results are shown in Table 2.

TABLE 2

|  | Applied | Electric current value (mA) | | |
|---|---|---|---|---|
|  | Voltage (V) | Immediately after voltage application | After 30 minutes | After 12 hours |
| Example 2 | 3 | 185 | 134 | 11 |
|  | 4 | 233 | 165 | 26 |
|  | 5 | 277 | 201 | 35 |
| Comparative | 3 | 182 | 134 | 13 |
| Example 2 | 4 | 236 | 171 | 30 |
|  | 5 | 281 | 252 | 120 |

From the results shown in Table 2, it is found that the solid electrolyte of the present invention that contains a fluorinated organic solvent is less liable to decompose, even under a high voltage, than the solid electrolyte of the Comparative Example that does not contain a fluorinated organic solvent.

As shown above, since the polymeric solid electrolyte of the present invention contains an electrolyte salt and a fluorinated organic solvent, the polymeric solid electrolyte can retain a sufficiently high ionic conductivity and provides improved stability against high voltage by exhibiting flame retardancy.

Also, the electrochemical element containing the solid electrolyte of the present invention has excellent response properties and load properties. Further, the reliability of the element such as suppression of liquid leakage and the safety such as prevention of ignition can be improved.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What we claim is:

1. A battery comprising:

a polymeric solid electrolyte formed of a polymer crosslinked in the presence of an electrolytic salt and an organic solvent wherein the polymer has a molecular weight of 1,000 to 200,000, contains polyethylene oxide or polypropylene oxide as a main chain, and the cross-linking agent is an acrylate having three or more functional groups or a methacrylate having three or more functional groups;

a positive electrode containing a metal oxide as a positive electrode active material; and a negative electrode utilizing oxidation-reduction reaction of lithium ions, wherein the organic solvent contains a fluorinated organic solvent and the polymeric solid electrolyte has a thickness of 5 to 100 μm.

2. The battery of claim 1, wherein the polymer is cross-linked at a temperature of 150° C. or less by ultraviolet rays having a wavelength of 190 to 400 nm.

3. The battery of claim 1, wherein the fluorinated organic solvent is a fluorinated carbonate, a fluorinated ether or a fluorinated ester.

4. The battery of claim 1, wherein the electrolyte salt is a salt of a cation selected from the group consisting of an alkaline metal ion, an alkaline earth metal ion and a tetraalkylammonium ion, and an anion selected from the group consisting of a perchlorate ion, hexafluorophosphate ion, tetrafluoroborate ion and trifluoromethanesulfonate ion.

5. The battery of claim 1, wherein the polymer has a molecular weight of 8,000 to 150,000.

* * * * *